United States Patent [19]
Mueller et al.

[11] Patent Number: 5,324,493
[45] Date of Patent: Jun. 28, 1994

[54] PREPARATION OF ALUMINOPHOSPHATES AND SILICOALUMINOPHOSPHATES HAVING THE AEL STRUCTURE USING 1,2-BIS-(4-PYRIDYL)-ETHANE

[75] Inventors: Ulrich Mueller, Neustadt; Wolfgang Hoelderich, Frankenthal; Guenter Lauth, Grosskarlbach, all of Fed. Rep. of Germany

[73] Assignee: BASF Aktiengesellschaft, Ludwigshafen, Fed. Rep. of Germany

[21] Appl. No.: 938,886

[22] Filed: Aug. 31, 1992

[30] Foreign Application Priority Data

Sep. 20, 1991 [DE] Fed. Rep. of Germany ....... 4131268

[51] Int. Cl.$^5$ ............................................. C01B 25/36
[52] U.S. Cl. .................................... 423/311; 423/305; 423/328.2; 502/208; 502/214
[58] Field of Search ............... 423/305, 311, 328.2; 502/214, 208

[56] References Cited

U.S. PATENT DOCUMENTS

| | | |
|---|---|---|
| 4,385,994 | 5/1983 | Wilson et al. |
| 4,440,871 | 4/1984 | Lok et al. ........................ 502/214 |
| 4,647,442 | 3/1987 | Derouane et al. ................ 423/305 |
| 4,851,204 | 7/1989 | Wilson et al. .................... 423/305 |

FOREIGN PATENT DOCUMENTS

| | | |
|---|---|---|
| 417863 | 3/1991 | European Pat. Off. |
| 2381715 | 9/1978 | France . |

OTHER PUBLICATIONS

A.C.S. Symp. Ser. 398 (1989), pp. 291–304 (no month).

Primary Examiner—Wayne Langel
Attorney, Agent, or Firm—John H. Shurtleff

[57] ABSTRACT

Aluminophosphates and silicoaluminophosphates having the AEL structure are prepared under hydrothermal crystallization conditions by a process in which 1,2-bis-(4-pyridyl)-ethane is used for the crystallization.

5 Claims, 1 Drawing Sheet

10 µm

10 μm

PREPARATION OF ALUMINOPHOSPHATES AND SILICOALUMINOPHOSPHATES HAVING THE AEL STRUCTURE USING 1,2-BIS-(4-PYRIDYL)-ETHANE

The present invention relates to a novel process for the preparation of aluminophosphates and silicoaluminophosphates having the AEL structure using 1,2-bis-(4-pyridyl)-ethane.

The term AEL structure represents a crystal structure type which is classified in Meier and Olson (Atlas of Zeolite Structure Types, 2nd Ed., Butterworths, London, 1987).

U.S. application Nos. 4,440,871 and 4,385,994 disclose methods for the preparation of aluminophosphates and silicoaluminophosphates having the AEL structure which use, for example, di-n-propylamine as a structure-forming template compound in the crystallization.

Furthermore, Wilson and Flanigen (A. C. S. Symp. Set. 398 (1989), 338,Table V) disclose that the synthesis of at least seven structurally different phosphates, including the structure types ALPO$_4$-11, -31,-39, -43, -46 and -50,is possible with the use of di-n-propylamine as an organic template compound.

Davis et al. (A.C.S. Symp. Ser. 398 (1989), 291–304) furthermore describe the preparation of a very large-pore aluminophosphate VPI-5 using di-n-propylamine as an organic structure former.

The disadvantages of these processes are that the preparation of the desired phosphates can be achieved only in a narrow range, for example with regard to the crystallization time and synthesis temperature to be maintained, and that the occurrence of phase mixtures can be avoided and hence reproducible product quality achieved only by a very labor-intensive procedure.

It is an object of the present invention to provide a process which remedies the abovementioned disadvantages.

We have found that this object is achieved by a novel and improved process for the preparation of aluminophosphates and silicoaluminophosphates having the AEL structure under hydrothermal crystallization conditions, wherein 1,2-bis-( 4-pyridyl )-ethane is used for the crystallization.

Figure 1:
FIG. 1 shows a scanning electron micrograph of the product prepared according to Example 1.

The preparation process for the crystalliztion of aluminophosphates and silicoaluminophosphates having the AEL structure using 1,2-bis-(4-pyridyl)-ethane can be carried out as follows:

The aluminophosphates and silicoaluminophosphates are obtained, for example, by crystallization from an aqueous medium by reacting a reactive source of aluminum, phosphorus and, if required, silicon, with the addition of the amine 1,2-bis- ( 4-pyridyl ) -ethane, at from 100° to 250° C., preferably from 130° to 230° C. particularly prefer-ably under autogenous pressure of the closed system in a pressure container for from a few hours to several days. The resulting product can be isolated after the reaction, washed and dried. For the decomposition and removal of the enclosed organic template compound 1,2-bis-( 4-pyridyl)-ethane, the dry material is carefully subjected to a heat treatment at from 400° to 600° C. with or without the addition of air, with the result that a microporous solid in nitrogen-free (amine-free) form is obtained.

The synthesis can be carried out, for example, in a hydrothermal reaction in autoclaves, either statically or with stirring. Advantageously used starting materials are phosphoric acid, pyrogenic silica, such as very pure silica, for example Aerosil ® 200 having an SiO$_2$ content of >99.8% and a BET surface area of 200±25 m$^2$/g, Pural SB ® in the form of pseudoboehmite as a source of alumina, 1,2-bis-( 4-pyridyl ) -ethane as the structure-determining amine, and water, preferably distilled or demineralized water.

The reaction mixtures which are crystallized contain the oxides in a molar ratio of

Al$_2$O$_3$:(1+/−0.3) P$_2$O$_5$: (30 to 100) H$_2$O with 1,2-bis-(4-pyridyl)-ethane/P$_2$O$_5$=from 0.3: 1 to 1.5: 1, preferably from 0.3: 1 to 0.6: 1. In the preparation of silicoaluminophosphates, the molar ratio of Si/Al is from 0.001: 1 to 0.5: 1, preferably from 0.005: 1 to 0.25: 1.

At the abovementioned temperatures, crystallization generally takes place in the course of from 24 to 150, advantageously from 48 to 96, hours. The cooled reaction mixture is filtered and the filter cake containing the reaction product is washed several times with water until it is neutral and is then dried at from 70° to 200° C., preferably from 100° to 150° C., particularly preferably from 110° to 130° C.

In the oxide form, the aluminophosphates have the following molar composition:

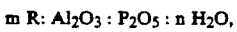

m R: Al$_2$O$_3$ : P$_2$O$_5$ : n H$_2$O, where R is 1,2-bis-(4-pyridyl)-ethane, which, after the crystallization, is present in the microporous void system in an amount of m of from 0.01 to 0.1, preferably from 0.02 to 0.07, particularly preferably from 0.03 to 0.06. The amine 1,2-bis-(4-pyridyl)-ethane acts as a template compound.

In the oxide form, the silicoaluminophosphates have the following molar composition:

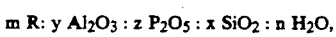

m R: y Al$_2$O$_3$ : z P$_2$O$_5$ : x SiO$_2$ : n H$_2$O, where y is from 0.25 to 0.45, preferably from 0.3 to 0.4, particularly preferably from 0.32 to 0.38, z is from 0.2 to 0.5, preferably from 0.3 to 0.4, particularly preferably from 0.33 to 0.37, and x is from 0 to 0.15, preferably from 0.02 to 0.11, particularly preferably from 0.06 to 0.09, for the molar amounts of aluminum, phosphorus and silicon in the three-dimensional crystalline tetrahedral lattice and m has the abovementioned meaning.

The molar ratios of the oxides in the microporous solids are Al$_2$O$_3$/P$_2$O$_5$=1.0+/−0.2 for aluminophosphates having the AEL structure and (Si$_x$Al$_y$P$_z$)O$_2$ where x is from 0.001 to 0.2, preferably from 0.00 1 to 0.1, y is from 0.4 to 0.5, preferably from 0.45 to 0.49, and z is from 0.4 to 0.5, preferably from 0.45 to 0.49, for silicoaluminophosphates having the AEL structure.

To remove the organic template compound 1,2-bis-(4-pyridyl)-ethane remaining in the crystalline product, the material dried in this manner is finally subjected to a heat treatment at from 400° to 600° C., preferably from 450° to 550° C. for example for from 8 to 24 hours, with or without the addition of air.

The novel crystalline microporous phosphates thus obtained have a crystal lattice which is composed of TO₄ tetrahedra where phosphorus and aluminum occur as tetrahedron atoms T.

The crystalline components are characterized with the aid of X-ray powder diffractometry. The diffraction patterns of the aluminophosphates and silicoaluminophosphates prepared by the novel process contain at least the interplanar spacings (d in Angstrom) stated in Table 1.

TABLE 1

| Angle 2THETA | Interplanar spacings d (Angstrom) | Intensity (100 I/I⁰) |
|---|---|---|
| 8.0–8.2 | 11.1–10.6 | 6–10 |
| 9.5–9.8 | 9.0–9.8 | 20–50 |
| 19.4–19.5 | 4.5–4.55 | 15–35 |
| 19.8–20.5 | 4.4–4.48 | 20–50 |
| 21.8–22.0 | 4.06–4.05 | 100 |
| 22.4–22.5 | 3.95–3.96 | 30–75 |
| 23.4–23.5 | 3.77–3.79 | 10–70 |

The sorption properties of the heat-treated materials are characterized by measuring the adsorption isotherm with nitrogen at 77K by a continuous, volumetric method (ASAP 2400 (R), Micromeritics). The aluminophosphates and silicoaluminophosphates prepared by the novel process exhibit a typical type I isotherm (Sing, Everett, Haul, Moscou, Pierotti, Rouquerol, Siemieniewska, Pure & Appl. Chem. 57 (4), (1985), 603–619). In the calculation of an equivalent specific surface area by the BET method (Brunauer, Emmett, Teller, J. Amer. Chem. Soc. 60 (1938), 309–319), the materials are characterized by surface areas of from 120 to 250, preferably from 130 to 220, m²/g.

When 1,2-bis-(4-pyridyl)-ethane is used as the structure-determining template, the synthesis of aluminophosphates and silicoaluminophosphates having the AEL structure can be carried out in a broad temperature range. Impurities and crystalline foreign phases, as may occur when di-n-propylamine is used as a structure former, are no longer found in the novel process.

The aluminophosphates and silicoaluminophosphates prepared according to the invention and having the AEL structure can be used as catalysts, for example for double bond isomerization, skeletal isomerization, such as the Beckmann rearrangement reaction (cycloalkanone oxime to lactam), conversion of methanol into olefins, dehydration of alcohols to olefins, of amides to nitriles and of aldehydes to give dienes, nucleophilic substitution, such as the amination of alcohols, for example methanol to methylamines, and electrophilic substitution, such as the alkylation of aromatics. Further catalytic applications are ether cleavage with elimination of an alcohol, as in the reactions of 1,1-dimethoxyethane to give methyl vinyl ether and methanol, 1,1-dimethoxy-2-methylpropane to give 1-methoxy-2-methylprop-1-ene and methanol, 1,1-isopropoxybutane to give 1-isopropoxybut-1-ene and isopropanol, 1,1-dimethoxy-2-phenylethane to give β-methoxystyrene and methanol, 1,1,3,3-tetramethoxypropane to give 3-methoxyacrolein and methanol, dialkoxyalkanoic esters to give alkoxyalkenoic esters and an alcohol, and trimethoxyethane to give dimethoxyethene and methanol. The materials obtained by the novel process can be used as cracking catalysts, as dewaxing catalysts or as catalysts for the aromatization of alkenes, for example but-1-ene and propene, the dehydrocyclization of alkanes, such as propane or hexane, to give aromatics, disproportionation, for example of toluene to give xylene and benzene or of ethylbenzene to give diethylbenzene and benzene, aldol condensation, for example of acetone to give mesityl oxide or, after doping with noble metal and under hydrogenating conditions, to give methyl isobutyl ketone, condensation of aldehydes/ketones with aromatics, preparation of triethylenediamine and other cyclic amines, for example from diaminoethane or hydroxyethylpiperazine or diethanolamine or monoethanolamine or piperazine, and for the rearrangement of epoxides, for example of styrene oxides to give phenylacetaldehydes.

The Examples which follow illustrate the invention.

Examples

EXAMPLE 1

This Example illustrates the crystallization of aluminophosphates having the AEL structure with the use of 1,2-bis-(4-pyridyl)-ethane.

114 g of demineralized water are initially taken in a teflon cup of a 300 ml laboratory autoclave and 22.7 g of pseudoboehmite (Pural SB ®, Condea) are added 40 g of 85% strength by weight phosphoric acid are added to the resulting suspension while stirring at 500 rpm. After the end of the addition, the mixture is cooled to room temperature using an ice bath and finally 16.1 g of 1,2-bis-(4-pyridyl)-ethane are added, after which the entire mixture is homogenized by stirring at 500 rpm.

The crystallization is carried out at 160° C. in the course of 70 hours. The crystalline product is filtered off, washed neutral and dried at 110° C. in the course of 24 hours.

The dry product is subjected to a heat treatment for 5 hours at 500° C. in the air. The weight loss is 10.0% by weight, based on the amount of substance used. Chemical analysis gives a composition of 40.5% by weight of $Al_2O_3$ and 57.1% by weight of $P_2O_5$. The yield is 90%, based on alumina used.

X-ray diffractometry is used to show that the product thus obtained is pure aluminophosphate having the AEL structure. The sorption properties are shown in Table 3 and the crystallinities in Table 2. FIG. 1 shows a scanning electron micrograph of the product prepared according to this Example.

EXAMPLE 2

This Example illustrates the crystallization of silicoaluminophosphates having the AEL structure with the use of 1,2-bis-(4-pyridyl)-ethane.

114 g of demineralized water are initially taken in a teflon cup of a 300 ml laboratory autoclave and 22.7 g of pseudoboehmite (Pural SB ®, Condea) and 5.3 g of a pyrogenic silica (Aerosil ® 200, Degussa) are added. 40 g of 85% strength by weight phosphoric acid are added to the resulting suspension while stirring at 500 rpm. After the end of the addition, the mixture is cooled to room temperature using an ice bath and finally 16.1 g of 1,2-bis-(4-pyridyl)-ethane are added, after which the entire mixture is homogenized by stirring at 500 rpm.

The crystallization is carried out at 160° C. in the course of 70 hours. The crystalline product is filtered off, washed neutral and dried at 110° C. in the course of 24 hours.

The dry product is subjected to a heat treatment for 5 hours at 500° C. in the air. The weight loss is 9.8% by weight, based on the amount of substance used. Chemical analysis gives a composition of 37.2% by weight of $Al_2O_3$, 51.8% by weight of $P_2O_5$ and 3.65% of $SiO_2$. The yield is 91%, based on alumina used.

X-Ray diffractometry is used to show that the product thus obtained is a silicoaluminophosphate having the AEL structure. The crystallinities are shown in Table 2 and the sorption properties in Table 3.

TABLE 2

X-ray crystallinities of the products from Examples 1 to 5 (total intensity in the 2THETA angular range from 18 to 25°)

| Example | 1 | 2 | 3 | 4 | 5 |
|---|---|---|---|---|---|
| Crystallinity | 100% | 96% | 90% | 97% | 86% |

TABLE 3

Sorption data from measurements of nitrogen adsorption

| Example | 1 | 2 | 3 | 4 | 5 | 6 |
|---|---|---|---|---|---|---|
| Weight of sample (g) | 0.332 | 0.350 | 0.416 | 0.276 | 0.788 | 0.521 |
| BET surface area ($m^2/g$) | 138 | 176 | 173 | 133 | 187 | 83 |
| Isotherm type | I | I | I | I | I | I, IV |

EXAMPLE 3

This Example illustrates the crystallization of silicoaluminophosphates having the AEL structure with the use of 1,2-bis-(4-pyridyl)-ethane for longer crystallization times and higher synthesis temperatures.

A reaction mixture is prepared by the method stated in Example 2. In contrast to that Example, the crystallization time is 90 hours and the synthesis temperature 200° C.

Working up is carried out as described in Example 2. The dry product is subjected to a heat treatment for 5 hours at 500° C. in the air. The weight loss is 9.9% by weight, based on the amount of substance used. The chemical analysis gives a composition of 36.4% by weight of $Al_2O_3$, 6% by weight of $P_2O_5$ and 2.29% by weight of $SiO_2$. The yield is 86%, based on alumina used.

X-Ray diffractometry was used to show that the product thus obtained is silicoaluminophosphate having the AEL structure. The crystallinities are shown in Table 2 and the sorption properties in Table 3.

EXAMPLE 4

This Example illustrates the crystallization of silicoaluminophosphates having the AEL structure with the use of 1,2-bis-(4-pyridyl)-ethane at higher synthesis temperatures, for a longer crystallization time and with smaller amounts of added $SiO_2$.

A reaction mixture is prepared by the method stated in Example 2. In contrast to that Example, only 2.65 g of pyrogenic silica (Aerosil ® 200, Degussa) are added and the crystallization time is 90 hours at a synthesis temperature of 200° C.

Working up is carried out as described in Example 2. The dry product is subjected to a heat treatment for 5 hours at 500° C. in the air. The weight loss is 9.8% by weight, based on the amount of substance used. The chemical analysis gives a composition of 38.0% by weight of $Al_2O_3$, 52.2% by weight of $P_2O_5$ and 1.83% by weight of $SiO_2$. The yield is 95%, based on alumina used.

X-Ray diffractometry was used to show that the product thus obtained is silicoaluminophosphate having the AEL structure. The crystallinities are shown in Table 2 and the sorption properties in Table 3.

EXAMPLE 5

This Comparative Example illustrates the crystallization of aluminophosphates having the AEL structure with the use of dipropylamine.

13.8 g of 85% strength by weight phosphoric acid in 35.3 g of demineralized water are initially taken in a teflon cup of a 300 ml laboratory autoclave and 8.26 g of pseudoboehmite (Pural SB ®, Condea) and 6.1 g of dipropylamine are added. The resulting suspension is homogenized while stirring at 500 rpm. Crystallization is effected at 200° C. in the course of 24 hours. The crystalline product is filtered off, washed neutral and dried at 110° C. in the course of 24 hours.

The dry product is subjected to heat treatment for 5 hours at 500° C. in the air. The weight loss is 10.0% by weight, based on the amount of substance used. The yield is 81%, based on alumina used.

By means of X-ray diffractometry with a D500 (R) powder diffractometer from Siemens using $CuK_{alpha}$ radiation, it is shown that the product is the $ALPO_4$-11 described in U.S. application No. 4,385,994. The crystallinities are shown in Table 2.

TABLE 2

X-Ray crystallinities of the products from Examples 1 to 5 (total intensity in the 2THETA angular range from 18 to 25°)

| Example | 1 | 2 | 3 | 4 | 5 |
|---|---|---|---|---|---|
| Crystallinity | 100% | 96% | 90% | 97% | 86% |

Table 2 clearly shows that the products from Examples 1 to 4, prepared according to the invention, have good crystallinity and in this respect are superior to the product from Example 5, prepared according to the prior art.

EXAMPLE 6

This Comparative Example illustrates the crystallization of aluminophosphates having the ABL structure with the use of dipropylamine during a prolonged crystallization time.

The reaction mixture is prepared as described in Example 5. In contrast to that Example, crystallization is effected at 200° C. in a prolonged crystallization time of 40 hours.

The crystalline product is filtered off, washed neutral and dried at 110° C. in the course of 24 hours.

The dry product was subjected to a heat treatment for 5 hours at 500° C. in the air. The weight loss is 5.4% by weight, based on the amount of substance used. The yield is 53%, based on alumina used.

X-Ray diffractometry is used to show that the product is the $ALPO_4$-11 described in U.S. application No. 4,385,994. In addition, considerable amounts of a further unidentified crystalline phase are found in this synthetic product. This Example shows that, when dipropylamine is used, it is not possible to obtain a wide range with regard to crystallization times in conjunction with purity of aluminophosphates having the AEL structure.

EXAMPLE 7

This Example illustrates the sorption properties of the molecular sieves having the AEL structure and prepared in Examples 1 to 4 by the novel process, and of the products prepared in Examples 5 and 6 using dipropylamine according to the prior art.

TABLE 3

| Sorption data from measurements of nitrogen adsorption | | | | | | |
|---|---|---|---|---|---|---|
| Example | 1 | 2 | 3 | 4 | 5 | 6 |
| Weight of sample (g) | 0.332 | 0.350 | 0.416 | 0.276 | 0.788 | 0.521 |
| BET surface area (m²/g) | 138 | 176 | 173 | 133 | 187 | 83 |
| Isotherm type | I | I | I | I | I | I, IV |

All measurements of the nitrogen adsorption are carried out at 77K using an ASAP® 2400 from Micromeritics. Before each determination, the samples are degassed at 200° C. under reduced pressure of <0.08 mbar.

The Table shows that the aluminophosphates and silicoaluminophosphates prepared according to the invention and having the AEL structure (Examples 1 to 4) can be used as microporous adsorbents.

EXAMPLES 8 to 11

To illustrate the use of the novel phosphates having the AEL structure as catalysts, the following reactions are carried out.

These reactions are effected in the gas phase under isothermal conditions in a tubular reactor (coil, 0.6 cm internal diameter, 90 cm long) in the course of at least 6 hours. The reaction products are isolated and characterized by conventional methods. Quantitative determination of the reaction products and of the starting materials is carried out by gas chromatography. The GC analyses are effected after 6 hours.

The silicoaluminophosphate having the ABL structure prepared according to Example 2 is molded with an extrusion assistant into 3 mm extrudates, which are dried at 120° C. for 16 hours and finally subjected to a heat treatment at 500° C. for 4 hours. This catalyst is used for the following reactions.

Reaction A: Conversion of 1,1-dimethoxyethane into methyl vinyl ether and methanol.

Reaction B: Conversion of 1,1-dimethoxy-2-phenylethane (diluted 50: 50 with tetrahydrofuran) into β-methoxystyrene and methanol.

Reaction C: Conversion of 1,1,3,3-tetramethoxypropane (saturated with water, about 4% by weight) into 3-methoxyacrolein and methanol.

Reaction D: Conversion of trimethoxyethane (diluted 50: 50 with tetrahydrofuran) into 1,2-dimethoxyethene and methanol.

The results are summarized in Table 4.

TABLE 4

| Example | 8 | 9 | 10 | 11 |
|---|---|---|---|---|
| Reaction | A | B | C | D |
| Temperature | 300° C. | 300° C. | 300° C. | 300° C. |
| WHSV (h⁻¹) | 2 | 2 | 2 | 2 |
| Conversion % | 100 | 100 | 24 | 70 |
| Selectivity | 96 | 94 | 82 | 93 |

This Example illustrates the possibility of using the silicoaluminophosphates prepared according to the invention as catalysts for the catalytic rearrangement of cyclohexanone oxime to give ε-caprolactam. The catalyst used is the same as the catalyst whose preparation is described in Examples 2 and 8 to 11.

The reaction is carried out in a linear reactor (0.8 cm internal diameter, 30 cm long) with a pre-evaporator. The catalyst (1 g) is mixed with quartz (5 g) and heated to 350° C. Cyclohexanone oxime is used in the form of a 5% strength by weight solution in toluene The WHSV is 10.5 h⁻¹, nitrogen being used as the carrier gas (150 ml/minute). The reaction products are condensed and collected in a cold trap at 0° C. Quantitative determination of the products and starting materials was carried out by gas chromatography.

Analysis of the reaction products gives a conversion of 96% and a selectivity of 55%, based on ε-caprolactam.

We claim:

1. In a process for the preparation of an aluminophosphate or a silicoaluminophosphate having the AEL crystalline structure under hydrothermal conditions, the improvement which comprises: using 1,2-bis-(4-pyridyl)-ethane as the organic template for the crystallization.

2. A process for the preparation of an aluminophosphate or silicoaluminophosphate having the AEL crystalline structure under hydrothermal crystallization conditions as claimed in claim 1, wherein the crystallization is carried out at from 100° to 250° C.

3. A process for the preparation of an aluminophosphate or silicoaluminophosphate having the AEL crystalline structure under hydrothermal crystallization conditions as claimed in claim 1, wherein the crystallized product is washed and dried and is heated from 400° to 600° C.

4. A process as claimed in claim 1, wherein the crystallization is carried out at from 100° to 250° C., the crystalline product is washed and dried and is then heated at from 400° to 600° C.

5. A process as claimed in claim 4, wherein the crystallization temperature is from 130° to 230° C. and the drying temperature is from 100° to 150° C.

* * * * *